(12) United States Patent
Rawal et al.

(10) Patent No.: US 11,537,554 B2
(45) Date of Patent: Dec. 27, 2022

(54) ANALYSIS OF STREAMING DATA USING DELTAS AND SNAPSHOTS

(71) Applicant: Elastic Flash Inc., Saratoga, CA (US)

(72) Inventors: Darshan Bharatkumar Rawal, Fremont, CA (US); Naoki Iwakami, Redwood City, CA (US); Pradeep Jnana Madhavarapu, Cupertino, CA (US)

(73) Assignee: Elastic Flash Inc., Saratoga, CA (US)

( * ) Notice: Subject to any disclaimer, the term of this patent is extended or adjusted under 35 U.S.C. 154(b) by 127 days.

(21) Appl. No.: 16/918,294

(22) Filed: Jul. 1, 2020

(65) Prior Publication Data

US 2021/0004352 A1 Jan. 7, 2021

Related U.S. Application Data

(60) Provisional application No. 62/869,541, filed on Jul. 1, 2019.

(51) Int. Cl.
| | |
|---|---|
| *G06F 16/30* | (2019.01) |
| *G06F 16/11* | (2019.01) |
| *G06F 16/23* | (2019.01) |
| *G06F 16/174* | (2019.01) |
| *G06F 16/17* | (2019.01) |

(52) U.S. Cl.
CPC ........ *G06F 16/128* (2019.01); *G06F 16/1734* (2019.01); *G06F 16/1756* (2019.01); *G06F 16/2322* (2019.01)

(58) Field of Classification Search
CPC ............ G06F 16/1734; G06F 16/2477; G06F 16/128; G06F 16/1756; G06F 16/24568; G06F 16/2322
See application file for complete search history.

(56) References Cited

U.S. PATENT DOCUMENTS

| | | | |
|---|---|---|---|
| 7,287,249 B2* | 10/2007 | Coyle | G06F 16/2308 707/999.1 |
| 9,116,901 B2* | 8/2015 | Bostock | G06F 16/128 |
| 9,342,573 B2* | 5/2016 | Chen | G06F 16/27 |
| 9,396,287 B1* | 7/2016 | Bhave | H04L 69/329 |
| 2007/0226730 A1* | 9/2007 | Coyle | G06F 16/289 717/170 |

(Continued)

*Primary Examiner* — Mahesh H Dwivedi
(74) *Attorney, Agent, or Firm* — IP Spring

(57) ABSTRACT

Implementations described herein relate to methods, systems, and computer-readable media to obtain snapshots used for analysis of streaming data. In some implementations, a computer-implemented method includes receiving initial data that includes a plurality of identifiers and corresponding timestamps, generating and storing a snapshot based on the initial data, wherein the snapshot includes the identifiers and a corresponding status, receiving a data stream that includes a subset of the identifiers, activity information for each identifier in the subset, and corresponding timestamps. The method further includes periodically analyzing the data stream to obtain a delta that includes an updated status for each identifier in the subset, storing the delta separate from the snapshot. The method further includes receiving a request for identifiers that are active in a particular time period, and based on the particular time period, retrieving active identifiers from the data stream, the delta, or the snapshot.

13 Claims, 5 Drawing Sheets

(56) References Cited

U.S. PATENT DOCUMENTS

| | | | | |
|---|---|---|---|---|
| 2013/0339301 A1* | 12/2013 | Saito | ................... | G06F 16/27 |
| | | | | 707/649 |
| 2013/0339643 A1* | 12/2013 | Tekade | ............... | G06F 11/1451 |
| | | | | 711/162 |
| 2014/0032566 A1* | 1/2014 | Agarwal | ............... | G06F 16/245 |
| | | | | 707/741 |
| 2014/0172803 A1* | 6/2014 | Diaconu | ............. | G06F 16/1873 |
| | | | | 707/649 |
| 2014/0330780 A1* | 11/2014 | Chen | ................... | G06F 16/27 |
| | | | | 707/625 |
| 2016/0042039 A1* | 2/2016 | Kaufmann | .......... | G06F 16/2456 |
| | | | | 707/722 |
| 2016/0110403 A1* | 4/2016 | Lomet | ................ | G06F 16/2329 |
| | | | | 707/695 |
| 2018/0052858 A1* | 2/2018 | Soncodi | ................ | G06F 16/13 |
| 2019/0251067 A1* | 8/2019 | Talagala | ............. | G06F 11/1471 |
| 2019/0347351 A1* | 11/2019 | Koomthanam | ....... | G06F 16/178 |

\* cited by examiner

Datastore Table 1 (402)

| key | f1 | f2 | ... | fn |
|---|---|---|---|---|
| ID1 | P | Q | ... | x |
| ID2 | x | x | ... | R |
| ... | ... | ... | ... | ... |

Activity log 1 (404)

| time | | f1 | f2 | ... | fn |
|---|---|---|---|---|---|
| 1 | ID1 | P | | | |
| 2 | ID2 | | | | R |
| 3 | ID1 | | Q | | |
| ... | ... | ... | ... | ... | ... |

Delta 1 (406)

| key | time | f1 | f2 | ... | fn |
|---|---|---|---|---|---|
| ID1 | 1 | P | | | |
| ID1 | 3 | | Q | | |
| ID2 | 2 | | | ... | R |
| ... | ... | ... | ... | ... | ... |

Datastore Table 2 (412)

| key | g1 | g2 |
|---|---|---|
| ID1 | S | x |
| ID2 | x | T |
| ... | ... | ... |

Activity log 2 (414)

| time | | g1 | g2 |
|---|---|---|---|
| 7 | ID1 | S | |
| 8 | ID2 | | T |
| ... | ... | ... | ... |

Delta 2 (416)

| key | time | g1 | g2 |
|---|---|---|---|
| ID1 | 7 | S | |
| ID2 | 8 | | T |
| ... | ... | ... | ... |

Stitched delta (420)

| key | time | f1 | f2 | ... | fn | g1 | g2 |
|---|---|---|---|---|---|---|---|
| ID1 | 1 | P | | ... | | | |
| ID1 | 3 | P | Q | ... | | | |
| ID1 | 7 | P | Q | | | S | |
| ID2 | 2 | | | ... | R | | |
| ID2 | 8 | | | ... | R | ... | T |

FIG. 4

ANALYSIS OF STREAMING DATA USING DELTAS AND SNAPSHOTS

RELATED APPLICATIONS

This application claims the benefit of priority to U.S. Provisional Application No. 62/869,541 filed Jul. 1, 2019, which is incorporated herein by reference in its entirety.

BACKGROUND

In many contexts, unique identifiers are assigned to entities such as products (e.g., product IDs, SKUs, etc.), users (e.g., login names, email addresses, etc.), advertisements (e.g., advertisement IDs), devices (e.g., MAC address, IMEI number, etc.), sensors such as Internet-of-Things (IoT) sensors, web pages or other documents (e.g., images, videos, shared documents, etc.), etc. Unique identifiers can be stored as part of transaction data in these contexts.

For example, retailers often store product identifiers or SKUs as part of the transaction record for an order placed by a customer. Further, retailers store the current status for products purchased in each order, e.g., "in warehouse," "shipped," "out for delivery," "delivered," "returned," etc. In other contexts, transaction data can include any type of activity that generates a data update, e.g., a user logging in or out of an online system such as email or social networking; a user viewing or clicking on advertisement; a user device being active or inactive on a network; a document being viewed or edited; etc.

In such contexts, there is often a need to determine the top identifiers that are active in a particular time period. For example, an online retailer might benefit from determining the product pages that get the most traffic from online shoppers, from identifying products that are being returned, etc. Determining top identifiers that meet a certain criterion can require scanning the entire identifier space, e.g., the entire database content, and may be computationally expensive. Further, delays in the determination of top identifiers may not be acceptable in certain contexts, e.g., a web caching service for a streaming video can function effectively if a list of top videos being viewed is available in real time, to enable such content to be cached.

Timely determination of top identifiers with low computational load is therefore an important need in many contexts. Implementations described herein were conceived in the context of these needs and/or problems, among other things.

In some situations, a transactional database may not support or may be unsuitable for analytics applications that analyze streaming data. While infrastructure (e.g., MapReduce nodes) can be utilized to process streaming data to support analytics, such infrastructure can be very expensive. Some implementations were conceived in the context of this problem, among other things.

SUMMARY

Implementations described herein relate to methods, systems, and computer-readable media to enable and perform analysis of streaming data using deltas and snapshots. In some implementations, a computer-implemented method includes receiving initial data that includes a plurality of identifiers and corresponding timestamps and generating and storing a snapshot based on the initial data. The snapshot may include each of the identifiers and a corresponding status. The method may further include receiving a data stream that includes a subset of the identifiers, activity information for each identifier in the subset of the identifiers, and corresponding timestamps, wherein the data stream is received after receiving the initial data. The method may further include periodically analyzing the data stream to obtain a delta that includes an updated status for each identifier in the subset of identifiers and storing the delta separate from the snapshot. The method may further include receiving a request for identifiers that are active in a particular time period and, based on the particular time period, retrieving active identifiers from the data stream, the delta, or the snapshot.

The method may further include after the periodically analyzing, merging the delta with the snapshot. In some implementations, the snapshot may be indexed by identifier. In some implementations, merging the delta with the snapshot may include updating the snapshot by replacing data in the snapshot for each identifier in the subset of identifiers with data in the delta for the one or more identifiers.

In some implementations, data in the snapshot may be ordered by identifiers. In these implementations, merging the delta with the snapshot may include performing a linear scan on the snapshot to identify records corresponding to each identifier in the subset of identifiers and updating the snapshot by replacing data in the snapshot for each identifier with data in the delta for the identifier.

In some implementations, the periodically analyzing and storing may be performed multiple times to obtain respective deltas and the method may further include merging the respective deltas to obtain a combined delta and merging the combined delta with the snapshot. The method may further include, prior to merging the combined delta with the snapshot, removing records from the snapshot that correspond to identifiers that are present in the combined delta.

In some implementations, retrieving active identifiers may include retrieving active identifiers from the delta and not from the snapshot. In some implementations, the data stream, the snapshot, and the delta may each be stored on separate hardware storage devices. In some implementations, the snapshot may be stored on a solid-state storage device (SSD), the delta may be stored on a 3DXpoint memory, and the data stream may be stored on a dynamic random-access memory (DRAM) device.

Some implementations include a non-transitory computer-readable medium with instructions stored thereon that, when executed by a hardware processor, cause the processor to perform operations that include receiving initial data that includes a plurality of identifiers and corresponding timestamps. The operations may further include generating and storing a snapshot based on the initial data, wherein the snapshot includes each of the identifiers and a corresponding status. The operations may further include receiving a data stream that includes a subset of the identifiers, activity information for each identifier in the subset of the identifiers, and corresponding timestamps, wherein the data stream is received after receiving the initial data. The operations may further include periodically analyzing the data stream to obtain a delta that includes an updated status for each identifier in the subset of identifiers and storing the delta separate from the snapshot. The operations may further include receiving a request for identifiers that are active in a particular time period and based on the particular time period, retrieving active identifiers from the data stream, the delta, or the snapshot.

In some implementations, the snapshot may be indexed by identifier, and the operations further include merging the delta with the snapshot by replacing data in the snapshot for each identifier in the subset of identifiers with data in the delta in the delta for the identifier in the subset of identifiers.

In some implementations, data in the snapshot may be ordered by identifiers, and wherein the operations further include merging the delta with the snapshot by performing a linear scan on the snapshot to identify records corresponding to each identifier in the subset of identifiers and updating the snapshot by replacing data in the snapshot for each identifier with data in the delta for the identifier.

In some implementations, the operation of retrieving active identifiers may include retrieving active identifiers from the delta and not from the snapshot. In some implementations, the operations of periodically analyzing and storing are performed multiple times to obtain respective deltas. In these implementations, the operations may further include merging the respective deltas to obtain a combined delta and merging the combined delta with the snapshot.

Some implementations include a computer-implemented method that includes accessing a change data capture (CDC) log, wherein the CDC log includes a plurality of entries indicative of updates to two or more database tables and wherein each entry in the CDC log has a respective timestamp. The method further includes obtaining a respective delta from the CDC log for each table of the two or more tables, wherein each row of the delta is keyed by a key of the corresponding table. The method further includes determining that at least two of the respective deltas are keyed by a same field and obtaining a stitched delta by combining the rows of the at least two of the respective deltas, wherein the stitched delta is keyed by the same field.

In some implementations, the stitched delta may include a value for at least one field of each table of the two or more tables, wherein the at least one field different from the key of the corresponding table. In some implementations, the stitched delta may include a plurality of entries, each corresponding to one or more entries in the CDC log.

In some implementations, the method may further include receiving a query associated with a particular time period, determining that the stitched delta includes one or more rows that are within the particular time period, and in response to the query, providing values of one or fields from the one or more rows of the stitched delta.

In some implementations, the same field may include an identifier and the stitched delta may be indexed by the same field, and the method may further include receiving a query for active identifiers in a particular time period, determining that the stitched delta includes one or more rows that are within the particular time period, retrieving active identifiers from the one or more rows of the stitched delta, and providing the active identifiers in response to the query.

In some implementations, obtaining the delta may include detecting that values in a first line and a second line of the activity log are identical other than values of timestamp fields, and in response to detecting that the values are identical, including only one of the first row or the second row in the delta.

In some implementations, obtaining the stitched delta may include detecting that there is at least one overlapping field that is included in a first delta obtained from a first activity log and in a second delta obtained from a second activity log and in response to detecting the at least one overlapping field, performing a deduplication process for the overlapping field.

BRIEF DESCRIPTION OF THE DRAWINGS

FIG. 4 is an illustration of obtaining a stitched delta from a CDC log, according to some implementations.

DETAILED DESCRIPTION

Figure 1:
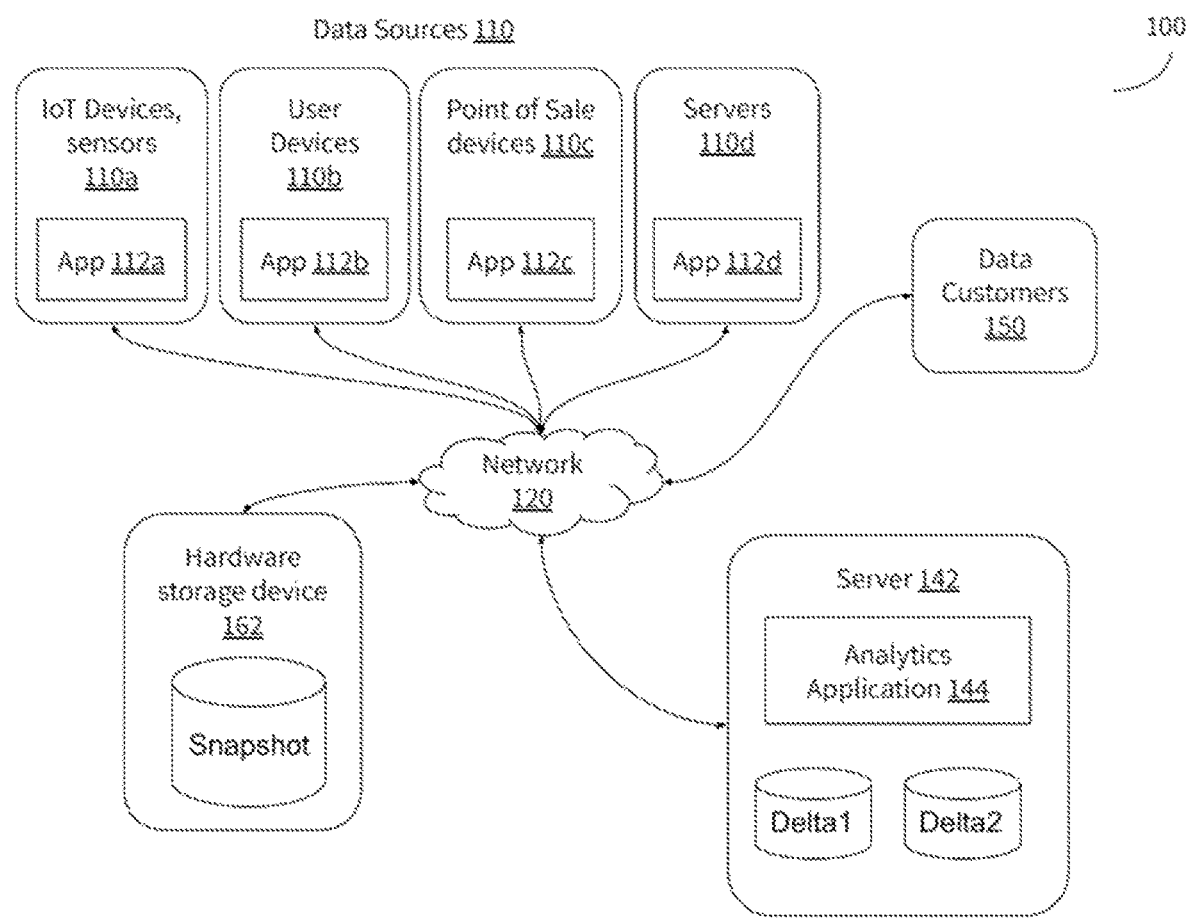
FIG. 1 is a block diagram of an example network environment which may be used for one or more implementations described herein.

In many contexts, only a subset of the total identifiers is active at a particular time. For example, only a subset of users of an online platform or application such as gaming, e-commerce, social networking, video streaming, or email are active at any given time. Further, the smaller the time window, the smaller the number of active identifiers, e.g., items ordered on an e-commerce platform in a 5-minute window typically include fewer identifiers than items ordered in a 24-hour window. Factors such as geographic distribution of users, functionality provided by the online application, etc., can impact the identifiers that are active in any time interval.

Implementations described herein enable efficient computation of the top-N active identifiers for any time interval. In some implementations, a snapshot is stored. The snapshot may include unique identifiers and corresponding status. In some implementations, status may be stored such that the activity level of each identifier is indicated for the time interval, e.g., "very active," "active," "mildly active," "inactive," etc.

In some implementations, a snapshot is computed from initial data (e.g., historical data) and is updated periodically. In some implementations, transactional data from an online application is received as a data stream. For example, such data may include data related to user activity, e.g., logging in, logging out, clickstream data, etc. In another example, such data may include data from various systems or sensors, e.g., point-of-sale terminals, IoT sensors, etc.

In some implementations, a delta is computed periodically (e.g., daily, hourly, etc.) based on the data stream to obtain a list of identifiers that are active in the period. Within any given period, the total number of active identifiers is typically less than the total unique identifiers for the application. Therefore, the computational resources required to compute a delta may be less than resources required to compute active identifiers for longer time periods.

In some implementations, a request may be received from an application, e.g., a transactional application, a dashboard or business intelligence application, etc. for top-N active identifiers for a particular time period. In some implementations, the periodically computed deltas that correspond to the particular time period may be identified and the list of active identifiers may be looked up from the deltas. For example, if the request is for active identifiers between "2-4 pm on June 1," and if deltas are computed every hour, deltas corresponding to "2-3 pm on June 1" and "3-4 pm on June 1" may be looked up to obtain the active identifiers. In some implementations, deltas are stored separately from the snapshot and data stream. For example, deltas may be stored in fast storage devices such as 3DXPoint memory which may enable the request to be serviced efficiently.

In an example, the request may correspond to a time period that includes a current time for which delta has not been computed. To serve such a request, active identifiers may be identified from the current time and provided as responses. If the time period includes both a current time for which delta has not been computed and a prior time for which a previously computed delta is available, the active identifiers may be merged with active identifiers retrieved from the delta and provided as a response. In another example, active identifiers may be determined from the snapshot and provided as the response when a request is for a time period that corresponds to the snapshot. The described techniques therefore can enable a "time-reduce" operation such that data values for specific time periods can be obtained, irrespective of whether the time period corresponds to data stored in a snapshot (based on a data store), a delta (that stores incremental changes to the data store) or a data stream (that includes data for which ingestion is underway).

In some implementations, deltas may be merged with the snapshot as soon as deltas are computed (concurrent merge). For example, deltas may be merged by looking up identifiers in the snapshot (e.g., based on an index, by performing a linear scan, etc.) and replacing status for those identifiers with corresponding status in the delta.

In some implementations, merging the delta with the snapshot may be performed upon receipt of a request for top-N identifiers (lazy merge). In some implementations, identifiers that are present in the delta may be removed from the snapshot.

In some implementations, data from a data stream may be stored in memory (e.g., DRAM) temporarily, e.g., until a delta is computed from the data. In some implementations, the delta may be stored in 3DXpoint (or similar) memory, e.g., that has a lower cost of operation per unit of storage than memory used for the data stream. In some implementations, a snapshot may be stored in a hardware storage device such as an SSD.

FIG. 1 illustrates a block diagram of an example network environment 100, which may be used in some implementations described herein. Environment 100 includes data sources 110, server 142, data customers 150, and hardware storage device 162, all coupled via network 120.

Environment 100 may include one or more devices that act as sources of data. Data sources 110 may include, for example, devices or sensors 110a, user devices 110b (e.g., mobile phones, tablets, laptops, wearable devices, personal health devices, fitness trackers, etc.), point of sale devices 110c (e.g., in-store point of sale terminals), servers 110d (e.g., web servers that provide data such as clicks on particular web pages, e-commerce servers that provide transactional data, financial servers that provide banking, stock market and other financial data, other database servers,), microservices, apps (e.g., smartphone apps, apps for wearable devices, etc.), file servers, e.g., that provide comma-separated value (CSV) files, eXtensible Markup Language (XML) files, log structured files, etc. Devices 110a-110d are collectively referred to as data sources 110 henceforth.

Each of data sources 110 may be configured with a corresponding application 112 (or app). For example, IoT devices/sensors 110a may include app 112a, User devices 110b may include app 112b, PoS devices 110c may include app 112c, and servers 110d may include app 112d. Applications 112 may provide functionality for data generated by a data source 110 to be sent to a distributed database for storage. Applications 112 may also provide other functionality. In some implementations, an application 112 may include an application component, e.g., a library, provided by a third-party other than a developer of application 112. For example, the application component may be provided by a cloud computing vendor that provides data storage and/or analytics services. For example, the application component may be part of a software development kit (SDK) provided by the cloud computing vendor. Data sources 110 may be coupled to network 120.

In some implementations, data sources 110 may be configured to send data via network 120. For example, such data may include sensor readings from sensor 110a, data obtained by user device 110b such as location information, user activity information (e.g., heart rate, websites visited, etc.), sales data from PoS device 110c (e.g., transaction records, payment method used for a transaction, SKUs of items purchased, etc.), or data from servers 110d (e.g., click data from a web server, logs from a firewall, purchase data from an e-commerce server, data from cameras or image sensors including image metadata such as timestamps, location, etc., radar/LIDAR data, etc.). Data sources 110 can utilize an application 112 to send data to server 142 via network 130. Data sources 110 may send data over network 120, e.g., as a data stream.

A data stream may include one or more data records. Each data record may have one or more data fields. For example, a data source 110 may generate data records from transactional activity, e.g., a periodic temperature reading obtained by a sensor, an order being recorded by a PoS device or e-commerce server, a user logging in or out of an online service, etc. The records may include timestamps and may be provided as a data stream that is updated whenever a transaction event occurs, when a certain number (e.g., 10) of transaction events occur, periodically (e.g., once a minute), or a combination of any of these. Thus, a data stream, as recited herein, may be a flow of data from data sources 110.

Environment 100 may further include data customers 150. For example, data customer 150 may include computing devices, e.g., reporting and analytics servers, that analyze data stored on hardware storage device 162. Reporting and analytics servers may execute software that analyzes data, including machine-learning algorithms, applications that include business logic to perform one or more actions based on the data, software utilized by data scientists to perform ad-hoc data analyses, etc. In some implementations, data customers 150 may generate requests, e.g., requests for top-N identifiers in a particular time period. In some implementations, responses to the requests may be utilized to perform actions in a transactional application, to provide a user interface such as interactive reports, or dashboards, etc. based on responses received from server 142.

Environment 100 may further include a server 142 that includes an analytics application 144. Analytics application 144 may perform all or part of method 200, to compute a snapshot, to obtain deltas, and to respond to requests, e.g., from data customer 150. While a single server is shown in FIG. 1, different implementations may include a plurality of servers, e.g., arranged in a cluster, that together provide functionality of server 142. Server 142 may be configured in communication with hardware storage device 162 and may write data to hardware storage device 162. For example, server 142 may write or update a snapshot.

Environment 100 may further include hardware storage device 162. In different implementations, any number of hardware storage devices may be provided. The hardware storage device 162 may store a snapshot. Hardware storage device 162 may include other types of storage hardware, e.g., dynamic random-access memory (DRAM), 3DXpoint memory, solid-stage storage (e.g., flash), hard disk drives, etc. Distributed data storage may provide data resiliency.

In some implementations, one or more elements of environment 100 may be part of a data center (e.g., of a cloud computing provider), and other elements may be outside the data center. For example, as illustrated in FIG. 1, data sources 110 may be outside the data center, e.g., situated at geographic locations distinct from that of the data center. Such elements may be referred to as being outside the perimeter of the data center.

In some implementations, one or more elements may be within a single data center, or multiple data centers, e.g., managed by a cloud computing provider. A trusted perimeter may be defined within the data center or multiple data centers which houses elements that are relatively secure and protected from external threats. The security of such elements may arise from their physical location (e.g. low risk of access from hackers, intruders, etc.), the configuration of such elements, or combinations thereof. Such elements may be referred to as being within the trusted perimeter of the data center. The cloud computing provider may control the elements within the trusted perimeter of the datacenter, e.g., start/stop, reboot, disconnect from network, etc. while the cloud computing provider does not control elements outside the trusted perimeter.

The environment may also include various elements that lie outside the trusted perimeter. These may include third party devices (e.g. sensors, computers, etc.) and systems that communicate with elements within the trusted perimeter of the data center, and which may pose a higher security risk within the environment (e.g. sensors that may be stolen and/or reconfigured, third party hardware and software elements that may be hacked, etc.)

Figure 2:
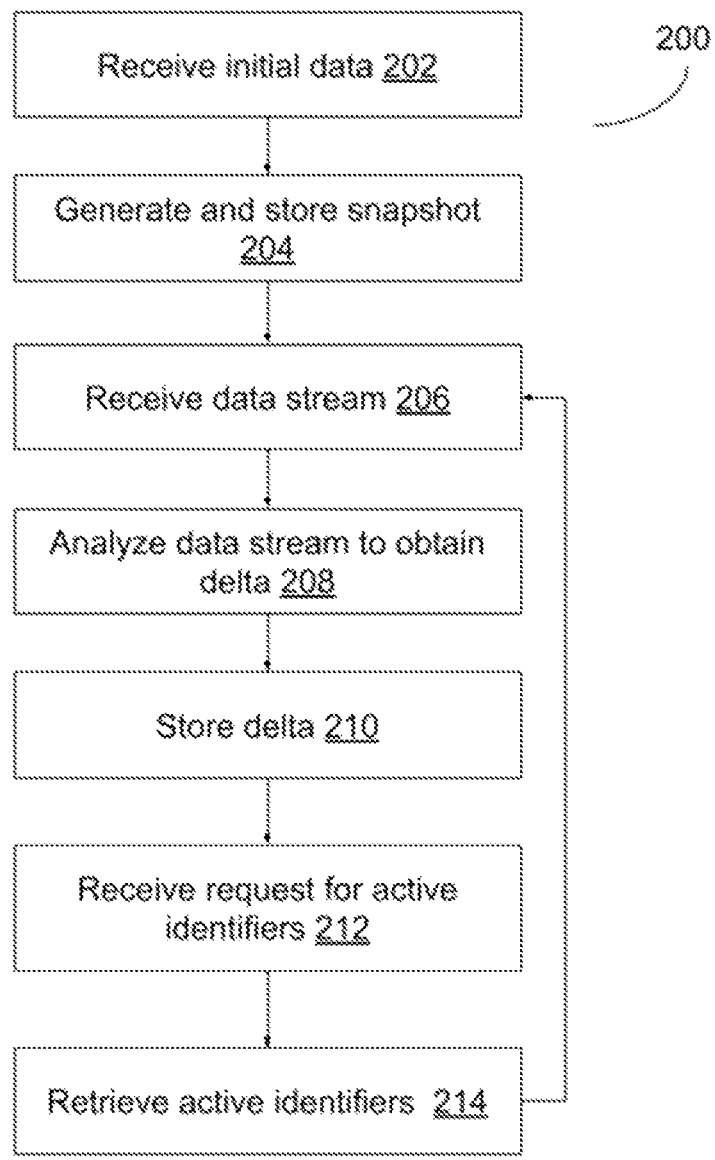
FIG. 2 is a flow diagram illustrating one example method, according to some implementations.

FIG. 2 is a flow diagram illustrating an example method 200, according to some implementations.

In block 202, initial data is received. In some implementations, initial data may include a plurality of identifiers, corresponding status, and timestamps. For example, when method 200 is implemented in a transactional data context after transactions have taken place prior to execution of block 202, the initial data may include data corresponding to identifiers that were part of the transaction data. In some implementations, initial data may be empty, e.g., if method 200 is implemented in a transactional data context where no transactions have occurred at the time block 202 is performed. Block 202 may be followed by block 204.

In block 204, a snapshot may be generated and stored. In some implementations, the snapshot may be stored on a hardware storage device, e.g., a solid-state storage device (SSD) that uses flash memory. In some implementations, generating the snapshot may include analyzing the initial data to determine a current status for each identifier of the plurality of identifiers. For example, if the initial data includes multiple transactions for the same identifier, the snapshot may record the status and corresponding timestamp for one or more of the transactions. For example, if a user placed multiple orders at an online retailer, the user identifier, order identifier, order status, and a timestamp for each of the orders may be stored in the snapshot. In this case, the user identifier and order identifier may be variables that are identified for top-N analysis. Top-N analysis may refer to analysis of transactional data to identify the top identifiers, e.g., most active identifiers in a particular time period. In this manner, the snapshot may include data for each order for each of the top-N identifiers. Block 204 may be followed by block 206.

In block 206, a data stream may be received. Upon receipt, data in the data stream may be stored on a hardware storage device, e.g., DRAM, other temporary storage, or other storage device. In some implementations, the hardware storage device that the delta is stored on is separate from the hardware storage device on which the snapshot is stored.

For example, the data stream may correspond to transactions that take place after the initial data is received in block 202. Continuing with the online order example, the data stream may include identifiers of users that placed orders, products there were ordered, order status, etc. generated as part of transaction data of the online retailer. Identifiers in the data stream may include a subset of the plurality of identifiers. The data stream may include activity information for each identifier in the subset of identifiers and corresponding timestamps.

In some implementations, the data stream may also include additional identifiers that are not part of the plurality of identifiers received in the initial data. Continuing with the online order example, additional identifiers may correspond to new users that placed an order, e.g., users that had not placed an order in the time period corresponding to the initial data. In this example, the data stream may include activity information and corresponding timestamps for the additional identifiers. Block 206 may be followed by block 208.

In block 208, the data stream may be analyzed to obtain a delta. For example, the analysis may be performed periodically. In some implementations, the interval at which the analysis to obtain the delta is performed may be based on the context of the transactional data. For example, in a warehouse context, items that were ordered the most may be determined multiple times in a day, e.g., for stock keeping and warehouse management. In another example, users that placed items in a shopping cart but did not make the purchase may be identified at the interval of one minute, e.g., so that a coupon, special offer, or reminder to place an order, may be provided based on the user being identified in the delta.

Analyzing the data stream may include performing aggregation operations, e.g., to determine order quantity for items by grouping orders for the item from multiple users, to determine most active users for a website based on number of pages visited within a time period corresponding to the data stream, etc. Based on the analysis, a delta is obtained that includes an updated status for each identifier in the subset of identifiers. In some implementations, data from the data stream may be removed from a storage device once the delta has been obtained.

In some implementations, analyzing the data stream may include detecting that there are duplicate transactions in the data stream, e.g., that the specified values in two different entries in the data stream are identical other than values of timestamp field. For example, duplicates may occur in a data stream when a data source that provides the data stream (e.g., attempts a transaction) retries the transaction, leading to duplicate entries in the data stream.

In response to detecting that there are duplicate transactions, the delta may be obtained such that only one of the duplicate entries of the data stream included in the delta. Timestamp fields (which may be different when a same transaction is retried and therefore included multiple times in the data stream) may be excluded from the comparison. In some implementations, if identical entries are detected, all but one of the identical entries may be ignored to eliminate duplicates in the delta. In some implementations, the entry with the most recent timestamp value may be included in the delta. Such detection and selective inclusion of entries from the data stream into the delta may be referred to as a deduplication process. Block 208 may be followed by block 210.

In block 210, the delta may be stored. For example, the delta may be stored in a storage device, e.g., 3DXPoint memory. In some implementations, the delta may be stored on a separate hardware storage device that the data in the data stream. Block 210 may be followed by block 212.

In block 212, a request may be received for active identifiers. In some implementations, the request may specify a time period, e.g., previous 5 minutes, previous hour, previous day, etc. The request may also specify a query for active identifiers. For example, the request may be received from a transactional application (e.g., that generated the data stream), an analytics application, or other applications. For example, if the transactional application is a game server, the request may be to identify active game participants for each game served by the game server in the last 5 minutes, to identify the most active game participants for the game server across all games in the previous day, to identify participants that purchased most game items, etc. For example, the requests may each correspond to specific functionalities provided by the game server, e.g., pairing up game participants with other participants that were active in the previous 5 minutes, identifying game participants to provide an offer based on being among top-N active participants in a day, to identify participants that receive recommendations of game items to purchase, etc. Block 212 may be followed by block 214.

In block 214, active identifiers are retrieved based on the particular time period specified in the request. The active identifiers may be retrieved from one or more of the data streams, in the delta, or the snapshot, e.g., based on the particular time period specified. For example, if block 208 is performed once per hour to obtain an hourly delta, and the request specifies "previous 15 minutes" as the time period, active identifiers may be identified from the data stream and may be provided in response to the request. In another example, if the request specifies "2-3 pm" and data for that time period is stored in a delta, active identifiers may be retrieved from the delta. In yet another example, if the request specifies "data from 1 June" and the active identifiers for this period are stored in the snapshot, active identifiers may be retrieved from the snapshot. Requests can specify any time period and active identifiers are retrieved accordingly. Block 214 may be followed by block 206 to continue receiving the data stream and obtain further deltas.

In some implementations, a plurality of deltas may be obtained, e.g., once each time block 208 is performed. In these implementations, each delta may include active identifiers for the time period for which the delta was computed, e.g., based on transactions in the data stream that occurred between two successive times that block 208 is performed.

In some implementations, method 200 may further include merging the delta with the snapshot. Merging the delta with the snapshot may be performed periodically, e.g., immediately upon obtaining the delta, at particular time intervals, when the total size of obtained deltas exceeds a threshold size, etc.

In some implementations, the snapshot may be indexed by identifier. In these implementations, merging the delta with the snapshot may include looking up each identifier in the subset of identifiers in the snapshot. Merging the delta may further include updating the snapshot by replacing data in the snapshot for each identifier in the subset of identifiers with data in the delta for the one or more identifiers. For example, merging can ensure that the snapshot is updated with the most recent status information for each identifier.

In some implementations, data in the snapshot may be ordered by an identifier, e.g., stored in ascending or descending order of identifiers. In these implementations, merging the delta with the snapshot may include performing a linear scan on the snapshot to identify records corresponding to each identifier in the subset of identifiers. Merging the delta may further include updating the snapshot by replacing data in the snapshot for each identifier with data in the delta for the identifier.

In some implementations, e.g., when a plurality of deltas is stored, the plurality of deltas may include respective deltas that correspond to different time periods during which transactions take place that form the data stream. In these implementations, the plurality of deltas may be merged to obtain a combined delta, prior to merging with the snapshot. For example, the combined delta may include each identifier once, and may store the most recent status of the identifier, determined based on the respective deltas. In some implementations, prior to merging the combined delta with the snapshot. Records that correspond to identifiers that are present in the combined delta may be removed from the snapshot.

Example of Use: Retailer

Consider a retail use case in which a retailer application is configured to send requests for the highest selling SKUs for particular time periods. In this example, to enable fulfilling such requests, the latest status of each instance (item) of the SKU may be tracked. For example, a snapshot may be stored that includes the latest SKID and a corresponding status (SHIPPED, DAMAGED, RESERVED, AVAILABLE, INWARDING) mapping. The data stream of transactions that updates of status of SKIDs is provided. A delta is computed to determine high velocity SKIDs that correspond to highest selling items. The delta is merged with the old snapshot to create a new snapshot, as described with reference to FIG. 2. For example, a snapshot at day zero may include status for various SKIDs, that each identify a particular item of a SKU, as follows:

Snapshot at D0
SKID1 →SHIPPED
SKID2→AVAILABLE
SKID3→INWARDING
SKID4-400→ . . . .

Transaction data may then be obtained that includes an updated status for one or more identifiers included in the snapshot with a timestamp corresponding to the status.

Transaction Data
timestamp 1, SKID1, DAMAGED
timestamp2, SKID2, SHIPPED
timestamp3, SKID1, RETURNED A delta computed from the transaction data may be merged with the snapshot, e.g., at the end of day one, to obtain a snapshot at D1.

Snapshot at D1
SKID1→SHIPPED, DAMAGED, RETURNED
SKID2→AVAILABLE, SHIPPED
SKID3-N→ . . . .

While the snapshot at D1 shows changes in the status of the SKIDs over time, snapshots may alternatively be stored that include only the most recent status (e.g., SKID1→RETURNED, SKID2→SHIPPED).

Figure 3:
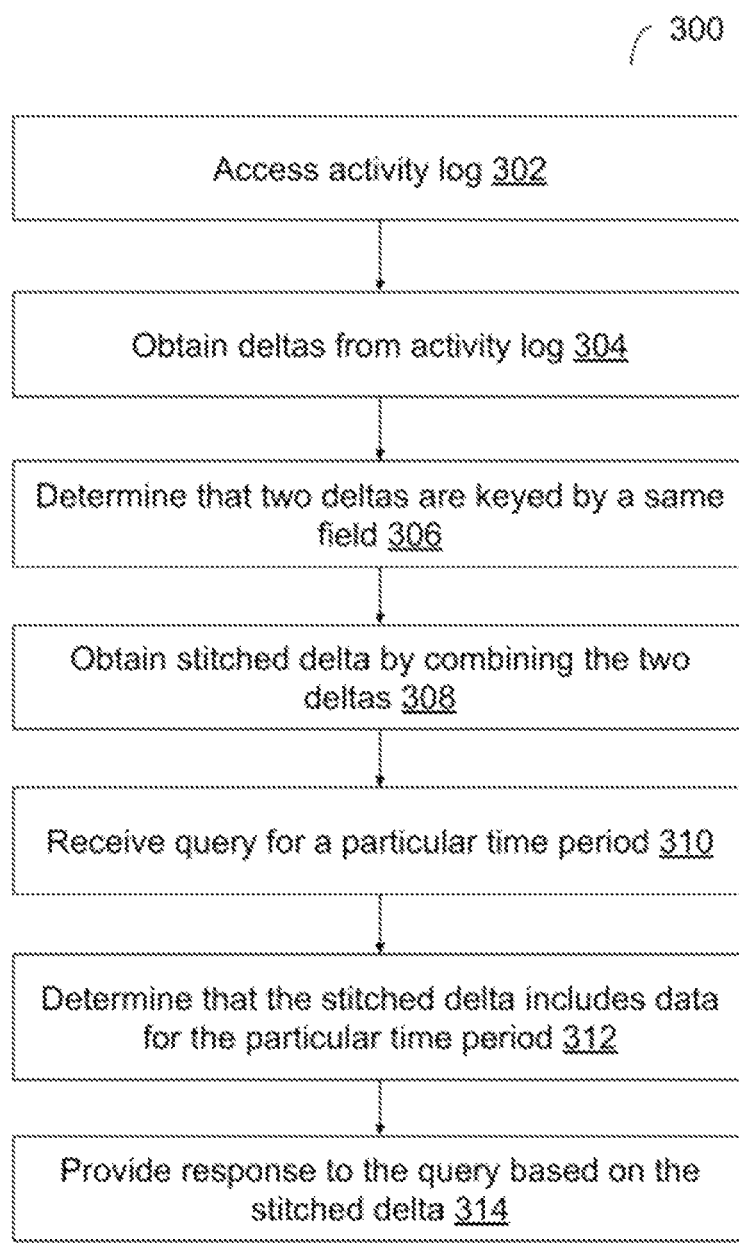
FIG. 3 is a flow diagram illustrating another example method, according to some implementations.

FIG. 3 is a flow diagram illustrating another example method 300, according to some implementations. FIG. 4 is an illustration of obtaining a stitched delta from an activity log, according to some implementations. Various blocks of FIG. 3 are explained with joint reference to FIG. 3 and FIG. 4.

Method 300 may begin at block 302. At block 302, an activity log is accessed. The activity log may be any log that captures activities such as queries made to a database (e.g., an RDBMS, a NoSQL database, or other type of data store), operations to write to a storage device (e.g., a solid-state storage device), operations that comprise backup of data from a distributed system, or other activities that include such transactions, a monitoring log, etc. An activity log may include any of create, read, update, or delete (CRUD) operations for a particular table of a database or other datastore. For example, the activity log may be a change data capture (CDC) log that corresponds to queries made to a database, e.g., a relational database management system (RDBMS), where the queries are associated with a particular table of the RDBMS. In some implementations, the CDC log may include queries received from one or more data sources (e.g., as described with reference to FIG. 1) that are processed by the RDBMS.

FIG. 4 illustrates activity log 1 (404) and activity log 2 (414) that correspond to a datastore table 1 (402) and datastore table 2 (412). For example, datastore table 1 and datastore table 2 may be part of the same RDBMS or of different RDBMSs, or other types of data stores, e.g., SSDs, data stores used to store a record of backup operations, etc. For simplicity, the datastore table 1 and datastore table 2 are also referred to as DB table 1 and DB table 2.

In some implementations, DB Table 1 (402) and DB table 2 (412) may be tables of transactional databases, e.g., that support transactions such as update to table rows, insertion of new table rows, deletion of table rows, etc. In various implementations, database(s) that include DB table 1 and DB table 2 may be implemented using any standard RDBMS technology, as NoSQL databases, or other type of database.

DB table 1 and DB table 2 may each include a plurality of rows, with a key that is unique to each row. For example, DB table 1 and DB table 2 each has a key field that has the value ID1 for the first row and ID2 for the second row. As indicated in FIG. 4, the tables may have any number of rows, with a corresponding value of the key field, such that the value is present in exactly one row of the table. Further, while FIG. 4 shows a single key field, a DB table may have multiple different key fields (e.g., one primary key and one or more secondary keys). Values of key fields may also be referred to as identifiers.

DB table 1 includes a plurality of other fields f1, f2, . . . , fn. Each field may have corresponding field type (e.g., numeric, text, etc.) and may store values. In the example shown in FIG. 4, a value of "x" in the row indicates an unchanged value of the field, while other values (shown in bold, italicized) indicates values that have changed recently, e.g., via transactions performed on DB table 1 that changed the value. Similarly, DB table 2 has fields g1 and g2 with corresponding values for each field in each row of the table.

In some implementations, a database or data store that stores DB table 1 and/or DB table 2 may be implemented in a distributed manner, e.g., across multiple database servers. In some implementations, such a database may be canonical reference sources for data values. In some implementations, when distributed over a plurality of servers, a transaction in the database (e.g., that may change values of fields in rows of one or more tables) may be implemented via a mechanism that retries the transaction or performs multiple copies of the transaction to different partitions of the database to ensure that no data is lost. In these implementations, the database may be implemented in an eventually consistent manner such that different partitions of the database synchronize with each other over time. In such a database, there may be temporary inconsistencies in the stored values for one or more database fields.

Transactional databases or data stores of this nature may be unsuitable for data analytics purposes, e.g., for analytics queries, since such queries may impose load that affects the performance of the database, e.g., reduces the transactional capabilities of the database.

Activity log 1 (404) may store changes made to DB table 1, e.g., transactions performed on DB table 1 in a plurality of lines. Lines in activity log 1 may be keyed by a timestamp field ("time") that stores a time associated with each change. For example, activity log 1 indicates that for the key ID1, the value of field f1 was updated to P at a time 1, and the value of field f2 was updated to Q at a time 3. Similarly, the value of field fn was updated to R at a time 2. Similarly, activity log 2 (414) may store changes made to DB table 2, e.g., for ID1, update of field g1 to value S at a time 7, and update of field g2 to value T at a time 8. In some implementations, activity log 1 and activity log 2 may be incremental logs, e.g., that store each change made to the corresponding table. Thus, activity logs capture each incremental change made to corresponding DB tables, while transactional DB tables store the current value for each field. Blanks shown in FIG. 4 in activity log 1 and activity log 2 indicate fields that were not updated during the particular change. Further, in some implementations, read operations on the table may be included in the activity log, in which case each line ion the activity log may correspond to a particular read operation.

Block 302 may be followed by block 304. In block 304, deltas are obtained from the activity logs. For example, delta 1 (406) may be determined from activity log 1 (404) and delta 2 (416) may be determined from activity log 2 (414). Each delta may be keyed by a field that is a key of the corresponding database table and a timestamp for each change to one or more fields associated with the identifier. In the example of FIG. 4, delta 1 is keyed by identifier, same as shown for DB table 1, and a timestamp for the change to one or more fields associated with the identifier. In some implementations, multiple deltas may be obtained from an activity log, each keyed by a respective key of the corresponding DB table, and timestamp. Deltas may be obtained for other activity logs in a similar manner. In some implementations, obtaining the delta may include analyzing the activity log to identify fields that have changed, and only such fields may be included in the delta.

In some implementations, obtaining the delta may include detecting that values in a first line and a second line of an activity log (e.g., any of 404 or 414) are identical other than values of timestamp field. Values of corresponding fields in a first line and a second line of the activity may be compared to detect that the first line and the second line are identical. Duplicates may occur in the activity log when the corresponding datastore doesn't provide confirmation of a particular transaction being successfully completed, in response to which a client (e.g., a data source that is attempting the transaction) may retry the transaction, leading to duplicate lines in the activity log.

For example, duplicate values may occur when an operation (e.g., transaction on the corresponding database table) is retried at different times. For example, if a datastore table stores information associated with an e-commerce shopping cart, the operation may include adding items to the shopping cart or removing items from the shopping cart, each leading to a corresponding change in the database table. If the e-commerce application fails to receive confirmation that the transaction was successful (e.g., update to the database table was completed within a stipulated time), the application may be configured to retry the transaction, leading to a duplicate transaction in all fields, except the timestamp field.

In response to detecting that the values in the two lines are identical, the delta may be obtained such that only one of the first line or the second line of the activity log is included in the delta. Timestamp fields (which may be different when a same transaction is retried and therefore included multiple times in the activity log) may be excluded from the comparison. In some implementations, if identical rows are detected, all but one of the identical rows may be deleted to eliminate duplicates. In some implementations, the line with the most recent timestamp value may be included in the delta.

For ease of illustration, FIG. 4 illustrates two tables (each with a single key), two activity logs, and two deltas. It will be understood that any number of tables, activity logs, and deltas may be used. Further, there may be more than one delta obtained from an activity log, e.g., different deltas may be based on different keys. Further, while FIG. 4 shows individual fields being updated in each change stored in the activity logs, it is possible that multiple (or all) fields may be updated in a single change (e.g., when a table row is inserted or deleted, or when all values of the row are updated). Timestamp values shown in FIG. 4 may be based on a consistent time source, such that all activity logs store data with timestamps that are consistent with each other.

Block 304 may be followed by block 306. In block 306, it is determined that two deltas (e.g., delta 1 and delta 2 of FIG. 4) are keyed by a same field. For large databases, there may be many sources of change to the database. For example, in an e-commerce context, database updates may come from a variety of sources such as a web portal, a mobile app, an inventory management system, a warehousing system, a distribution system, or other sources. For example, the data can be received from a variety of microservices that provided data from such data sources. Therefore, there may be a number of activity logs, e.g., each associated with a respective source. Determining that two deltas are keyed by the same field may include analyzing each delta to identify fields and comparing field values with those of fields in other deltas.

Block 306 may be followed by block 308. In block 308, a stitched delta (e.g., stitched delta 420) is obtained from deltas that are identified as being keyed by the same field. In the example illustrated in FIG. 4, delta 1 (406) and delta 2 (416) are keyed by the same identifier. Delta 1 includes fields f1, f2, . . . , fn, while delta 2 includes fields g1 and g2. To obtain the stitched delta, data from the individual deltas is combined, e.g., fields f1-fn and g1-g2 are included in a single row of the stitched delta (420), keyed by the identifier and timestamp. While FIG. 4 shows different timestamps for the example entries in delta 1 and delta 2, it will be understood that each delta can have entries associated with the same timestamps.

The stitched delta includes changes to values of fields that are in different activity logs. In other words, changes to database tables that originate from different sources are combined in the stitched delta. In this manner, data is stitched together in the stitched delta and captures relationship between different entities. Further, the stitched delta includes timestamps with each change, thus storing incremental changes to the field value.

In some implementations, blocks 302-308 may be repeated any number of times. For example, blocks 306-308 may be performed multiple times to obtain a plurality of stitched deltas. Further, blocks 302-304 may be performed periodically to obtain new activity logs (e.g., updated with changes from a time period since the last performance of block 302) and to obtain deltas from such logs. In some implementations, blocks 302-308 may be performed when certain conditions are satisfied, e.g., a new activity log is available, a threshold amount of time since a performance of any of blocks 302-308, or upon receipt of a command or query (e.g., from a data analytics application).

In some implementations, a stitched delta may store data within a specific time period, e.g., last 5 minutes, last 1 hour, last 24 hours, etc. For example, a stitched delta may support analytics queries for specific time periods, e.g., orders received in the last 5 minutes, number of ads clicked on in the last hour, page views in the last day, etc. While it may be possible to query databases that store such data, such analytics queries may receive inaccurate results, for one or more of the reasons outlined above (distributed/partitioned databases, databases implemented with eventual consistency, etc.). Further, transactional databases (or other datastores that include tables 402 and 412) may not support the load of such queries.

In some implementations, a recommendation to construct the stitched delta may be provided to a developer, a data analyst, or other user of a data store. For example, the recommendation may indicate that delta 1 and delta 2 have the same key and can therefore be combined into a stitched delta.

In some implementations, the specific time period may be based in part on the type of application, the type of analytics queries, and/or parameters of the transactional database or data store (e.g., consistency guarantees, query supporting capabilities, etc.). In some implementations, data from the stitched delta that is associated with timestamps not within the specific time period may be purged. Thus, the total number of entries in the stitched delta may be relatively low and the stitched delta may include only data associated with active identifiers within the specific time period. Other deltas may also be purged similarly.

In some implementations, the individual deltas may also be purged after a threshold time interval. The threshold time interval may be specified for rows of the delta (e.g., rows that include identifiers ID1, ID2, etc.) and/or by fields or columns of the delta (e.g., f1, f2, g1, etc.). Purging of the delta may only be performed once the conditions specified (for rows and/or columns) are fulfilled.

In some implementations, block 308 may be followed by block 310. In block 310, a query may be received for a particular time period. For example, the query may include a request for active identifiers in the particular time period (e.g., similar to block 212). Active identifiers, as referred to here, may include rows (e.g., ID1, ID2, . . . ) or active fields (e.g., columns f1, f2, g1, etc.) Further, the query may include a request for one or more data values (e.g., of any of fields f1, f2, . . . , fn, g1, g2 in the example of FIG. 4) within the particular time period. For example, the query may be for a value of a particular field at a particular time instant, or changes to the value of the particular field that occurred within the particular time period. Block 310 may be followed by block 312.

In block 312, it is determined that a particular stitched delta, e.g., stitched delta 420 of FIG. 4, includes data for the particular time period for the one or more fields that are subject of the query (e.g., identifiers, and/or fields f1, f2, fn, g1, g2, etc.). Block 312 may be followed by block 314.

In block 314, a response is provided to the query based on the stitched delta. For example, if the query is for value of a particular field at a particular time, such a value may be obtained by a lookup in the stitched delta, e.g., for the nearest preceding time instant for which the value is stored in the stitched delta. In another example, if the query is for updates to the field during the particular time period, multiple rows of the delta that included such updates may be identified and provided in the response to the query. In some implementations, when the query is for active identifiers within the time period, such identifiers may be retrieved from the rows of the stitched delta and provided in response to the query. Blocks 310-314 may be repeated any number of times to serve different queries.

For example, such queries may enable a data analytics application to empirically detect duplicates in the stitched delta and specify how such duplicates may be utilized for data analytics. In some implementations, empirical detection may be based on comparisons of data values of the fields and corresponding timestamps in two or more of the deltas from which the stitched delta is obtained. In general, fields in different activity logs may be different based on the underlying data source, such that there are no duplicate fields in the stitched delta.

In certain situations, however, more than one activity log may include the same field, such that activity logs and the corresponding deltas may have one or more overlapping fields. Depending on the data analytics application, such overlapping fields may be handled in different ways. The term "same field" as used herein refers to the semantic meaning of the field, such that even if the overlapping fields have different field names in different activity logs, such fields can be detected. Upon detection of overlapping fields, a deduplication process may be performed.

In a first example deduplication process, timestamps associated with each activity log that have overlapping fields can be utilized to determine the sequence of changes to the overlapping fields. In case there are two activity logs that include a change to the same field with the same timestamp, a priority can be assigned to each activity log such that a winner is determined and the corresponding value of the field be included in the stitched delta, with the other field being discarded. In this option, only one value is stored for the overlapping field.

In another example deduplication process, the stitched delta may be configured to include both fields as separate columns (e.g., if fields f1 and g1 are the same field, both can be included separately in the stitched delta). A deduplication operation can then be performed on the stitched delta, e.g., by a downstream process that detects that the two fields have the same semantic meaning, such that a value suitable for the purposes of the analytics application or other downstream process that reads data from the stitched delta is utilized. The downstream process that performs deduplication may be part of an analytics application or may be approved by the application, e.g., documentation regarding the deduplication operation and options to select a specific one of the overlapping fields, to select both fields, or specify conditions of selecting either of the fields, etc. may be provided to the application developer such that the application can select whether any column deduplication is performed, and if so, how the column deduplication is performed.

In some implementations, deduplication may be performed for individual deltas (to remove or flag duplicate rows) prior to obtaining the stitched delta (e.g., as described with reference to block 304), and the stitched delta may again be deduplicated (to remove or flag duplicate columns or fields, obtained from different individual deltas). In some implementations, no deduplication may be performed, and the data analytics application may instead be provided data directly derived from activity logs. In some implementations, deduplication may be performed on the stitched delta, but not on the individual deltas. In some implementations, deduplication may be performed on the individual deltas, but not on the stitched delta.

Thus, the use of a delta (or a stitched delta) allows an application (e.g., an analytics application) that accesses an individual delta for a particular datastore table or a stitched delta to obtain a value of a field at a particular time without accessing the transactional database (which may be unreliable in periods during which consistency guarantees are not provided). The stitched delta can also be used to create a slave of the transactional database or datastore.

In this manner, a data analytics application can obtain values of one or more fields and/or active identifiers during a particular time period by querying a delta or a stitched delta that includes such values. Further, changes to the fields over time can be provided by rewinding the corresponding delta, e.g., reading values from the stitched delta at different timestamps) and aggregating such values. For example, in an e-commerce context, if the field is "number of items in shopping cart" the value may increase over time as a customer adds items, till the order is placed at which time the items in the shopping cart may fall to zero.

The analytics application can thus obtain information that can be used to answer questions such as, "what is the average number of items in the shopping cart after a customer has spent 5 minutes at e-commerce website?" "how many times on average do customers remove items from the shopping cart?" "how long does it take for a customer to place an order after the shopping cart is full?" etc. even when the underlying data for such queries originates from different data sources (e.g., any of data sources 110) and/or when there are multiple tables in which such data are stored.

Further, the stitched delta enables the analytics application to obtain accurate data values without accessing the transactional database, even when there are dirty transactions, e.g., duplicate transactions for the same event, or when the transactions are over multiple distributed tables. The stitched delta acts as a versioned information source, e.g., the stores different versions of the same data field, indexed by a respective timestamp. The stitched delta enables data scientists, developers, analysts, and other users to perform such queries without writing any code.

In some implementations, the stitched delta may be utilized to obtain micro-snapshots that accumulate changes. For example, data in the stitched delta may be aggregated at certain intervals, e.g., per minute, per 5 minutes, etc. to obtain a micro-snapshot at particular time instances. This can help speed up responses to analytics queries such as "total sales per minute" without performing a rollup operation each time. The stitched-delta thus provides write-once semantics (consistent data values) empirically by utilizing the activity log as the source.

The stitched delta that permits time-based queries and/or micro-snapshots can deliver materialized views in a distributed database system, without the overhead of requiring an automatic refresh from the transactional database. By using activity logs to automatically construct the stitched delta, the described techniques enable data analytics applications to obtain correct data values in real-time without increasing the burden on the transactional database, which can be implemented in an eventually consistent manner. The analytics application can thus provide graphical trends, dashboards, or other user interfaces, based on real-time data without burdening the transactional database. In some implementations, the user interface can include query construction options that enable an analyst to construct queries for data that can be served via one or more stitched deltas.

The described techniques eliminate the need for separate analytics infrastructure, e.g., the use of MapReduce to combine data across different RDBMS tables or other data stores that is necessary to enable access data values to particular fields as they existed at a particular point in time. The described techniques utilize already available activity logs (that are typically ingested into a database) and can be implemented without changes to the data sources that provide such data and databases that store such data.

Figure 5:
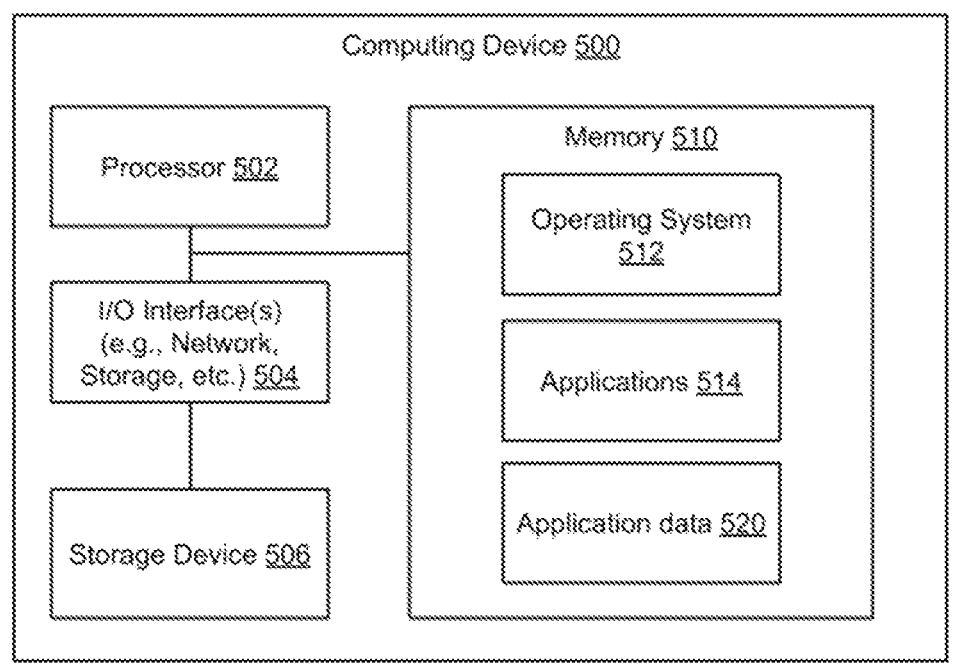
FIG. 5 is a block diagram of an example computing device which may be used to implement one or more features described herein.

FIG. 5 is a block diagram of an example computing device 500 which may be used to implement one or more features described herein. In one example, device 500 may be used to implement a computer device, e.g., a data stream storage, or analytics device, and perform appropriate method implementations described herein. Device 500 can be any suitable computer system, server, or other electronic or hardware device. For example, the device 500 can be a mainframe computer, server computer, desktop computer, workstation, portable computer, or medical device. In some implementations, device 500 includes a processor 502, input/output (I/O) interface 504, one or more storage devices 506, and a memory 510.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 510 is typically provided in device 500 for access by the processor 502 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 510 can store software operating on the server device 500 by the processor 502, including an operating system 512, one or more applications 514, and application data 520. In some implementations, applications 514 can include instructions that enable processor 502 to perform the functions described herein, e.g., some or all of the method of FIG. 2 or FIG. 3. Memory 510 also stores application data 520.

For example, applications 514 can include one or more applications that provide functionality to receive initial data and compute a snapshot, to receive a data stream and compute one or more deltas, to merge deltas to obtain a combined delta, to merge deltas with snapshots to obtain an updated snapshot data, and to provide responses to requests, e.g., requests for top-N active identifiers in a particular time period, as described with reference to FIG. 2. In another example, application 514 can implement functionality described with reference to FIG. 3.

Any of software in memory 510 can alternatively be stored on any other suitable storage location or computer-readable medium. In addition, memory 510 (and/or other connected storage device(s)) can store other instructions and data used in the features described herein. Memory 510 and any other type of storage (magnetic disk, optical disk, magnetic tape, or other tangible media) can be considered "storage" or "storage devices."

I/O interface 504 can provide functions to enable interfacing the computing device 500 with other systems and devices. For example, network communication devices, external storage devices, and other input/output devices can communicate via interface 504. In some implementations, the I/O interface 504 can connect to interface devices including input devices (keyboard, pointing device, touchscreen, microphone, camera, scanner, etc.) and/or output devices (display device, speaker devices, printer, motor, etc.).

Storage device 506 is one example of a storage device, e.g., a solid-state storage device, a hard disk drive, etc. that can be used by operating system 512 and/or one or more applications 514. Storage device 506 is a direct attached storage device, e.g., coupled to processor 502 and directly controlled by processor 502. Processor 502 is coupled to I/O interface(s) 504, storage device 506, and memory 510 via local connections (e.g., a PCI bus, or other type of local interface) and/or via networked connections.

For ease of illustration, FIG. 5 shows one block for each of processor 502, I/O interface 504, storage device 506, and memory 510 with software blocks 512, 514, and 520. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. Any suitable component or combination of components of system 142 or similar system, or any suitable processor or processors associated with such a system, may perform the operations described, e.g., with reference to FIG. 2 and/or FIG. 3.

A user device can also implement and/or be used with features described herein. Example user devices can be computer devices including some similar components as the computing device 500. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices.

One or more methods described herein (e.g., method 200 or method 300) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run in a web browser, a server application that executes on a single computer, a distributed application that executes on multiple computers, etc. In one example, a client/server architecture can be used, e.g., a mobile computing device (as a client device) sends user input data to a server device and receives from the server the final output data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
    receiving initial data that includes a plurality of identifiers and corresponding timestamps;
    generating and storing a snapshot based on the initial data, wherein the snapshot includes each of the identifiers and a corresponding status and wherein generating and storing the snapshot comprises analyzing the initial data to determine the status for each identifier of the plurality of identifiers;
    receiving a data stream that includes a subset of the identifiers, activity information for each identifier in the subset of the identifiers, and corresponding timestamps, wherein the data stream is received after receiving the initial data;
    periodically analyzing the data stream to obtain a delta that includes an updated status for each identifier in the subset of identifiers, wherein the periodically analyzing includes performing aggregation operations to obtain the updated status for each identifier in the subset of identifiers;
    storing the delta separate from the snapshot;
    receiving a request for identifiers that are active in a particular time period; and
    based on the particular time period, retrieving active identifiers from the data stream, the delta, or the snapshot.

2. The computer-implemented method of claim 1, further comprising, after the periodically analyzing, merging the delta with the snapshot.

3. The computer-implemented method of claim 2, wherein the snapshot is indexed by identifier, and wherein merging the delta with the snapshot comprises updating the snapshot by replacing data in the snapshot for each identifier in the subset of identifiers with data in the delta for the one or more identifiers.

4. The computer-implemented method of claim 2, wherein data in the snapshot is ordered by identifiers, wherein merging the delta with the snapshot comprises:
    performing a linear scan on the snapshot to identify records corresponding to each identifier in the subset of identifiers; and
    updating the snapshot by replacing data in the snapshot for each identifier with data in the delta for the identifier.

5. The computer-implemented method of claim 1, wherein the periodically analyzing and storing are performed multiple times to obtain respective deltas, the method further comprising:
    merging the respective deltas to obtain a combined delta; and
    merging the combined delta with the snapshot.

6. The computer-implemented method of claim 5, further comprising, prior to merging the combined delta with the snapshot, removing records from the snapshot that correspond to identifiers that are present in the combined delta.

7. The computer-implemented method of claim 1, wherein retrieving active identifiers comprises retrieving active identifiers from the delta and not from the snapshot.

8. The computer-implemented method of claim 1, wherein the data stream, the snapshot, and the delta are each stored on separate hardware storage devices.

9. The computer-implemented method of claim 8, wherein the snapshot is stored on a solid-state storage device (SSD), the delta is stored on a 3DXpoint memory, and the data stream is stored on a dynamic random-access memory (DRAM) device.

10. A non-transitory computer-readable medium with instructions stored thereon that, when executed by a hardware processor, cause the processor to perform operations comprising:
    receiving initial data that includes a plurality of identifiers and corresponding timestamps;
    generating and storing a snapshot based on the initial data, wherein the snapshot includes each of the identifiers and a corresponding status and wherein generating and storing the snapshot comprises analyzing the initial data to determine the status for each identifier of the plurality of identifiers;
    receiving a data stream that includes a subset of the identifiers, activity information for each identifier in the subset of the identifiers, and corresponding timestamps, wherein the data stream is received after receiving the initial data;

periodically analyzing the data stream to obtain a delta that includes an updated status for each identifier in the subset of identifiers, wherein the periodically analyzing includes performing aggregation operations to obtain the updated status for each identifier in the subset of identifiers;

storing the delta separate from the snapshot;

receiving a request for identifiers that are active in a particular time period; and based on the particular time period, retrieving active identifiers from the data stream, the delta, or the snapshot.

11. The non-transitory computer-readable medium of claim 10, wherein the snapshot is indexed by identifier, and wherein the operations further comprise merging the delta with the snapshot by replacing data in the snapshot for each identifier in the subset of identifiers with data in the delta in the delta for the identifier in the subset of identifiers.

12. The non-transitory computer-readable medium of claim 10, wherein data in the snapshot is ordered by identifiers, and wherein the operations further comprise merging the delta with the snapshot by:

performing a linear scan on the snapshot to identify records corresponding to each identifier in the subset of identifiers; and updating the snapshot by replacing data in the snapshot for each identifier with data in the delta for the identifier.

13. The non-transitory computer-readable medium of claim 10, wherein the periodically analyzing and storing are performed multiple times to obtain respective deltas, and wherein the operations further comprise:

merging the respective deltas to obtain a combined delta; and merging the combined delta with the snapshot.

* * * * *